(12) United States Patent
Fisher et al.

(10) Patent No.: US 11,386,771 B2
(45) Date of Patent: Jul. 12, 2022

(54) SYSTEM AND DEVICE FOR MANAGEMENT OF MEDICATION DELIVERY DEVICES

(71) Applicant: ATERICA INC., Kitchener (CA)

(72) Inventors: Michael Fisher, Waterloo (CA); Alexander Leyn, Kitchener (CA); Richard Edwards, New Hamburg (CA); Steven Orzel, North Hamilton (CA); Erik Helge Borg, Stockholm (SE); Paul McInnis, Waterloo (CA); Cristian Cherler, Kitchener (CA); Heinz Wolter, Linwood (CA); John Chinnick, Conestogo (CA); Jacob Stahlbaum, Waterloo (CA)

(73) Assignee: Aterica Inc., Kitchener (CA)

( * ) Notice: Subject to any disclaimer, the term of this patent is extended or adjusted under 35 U.S.C. 154(b) by 358 days.

(21) Appl. No.: 15/377,083

(22) Filed: Dec. 13, 2016

(65) Prior Publication Data
US 2017/0162033 A1    Jun. 8, 2017

Related U.S. Application Data

(63) Continuation of application No. PCT/IB2015/001416, filed on Jun. 15, 2015.
(Continued)

(51) Int. Cl.
*G08B 25/01*    (2006.01)
*H04W 4/90*     (2018.01)
(Continued)

(52) U.S. Cl.
CPC .............. *G08B 25/016* (2013.01); *A61J 1/03* (2013.01); *A61J 7/0427* (2015.05); *G08B 21/24* (2013.01);
(Continued)

(58) Field of Classification Search
CPC ....... G08B 25/016; G08B 21/24; H04W 4/90; H04W 4/023; H04W 4/22; H04W 68/02; H04W 88/16
See application file for complete search history.

(56) References Cited

U.S. PATENT DOCUMENTS

| 6,817,986 B2 | 11/2004 | Slate et al. |
| 7,534,230 B2 | 5/2009 | Follman et al. |

(Continued)

FOREIGN PATENT DOCUMENTS

| CA | 2644547 A1 | 11/2007 |
| CA | 2905774 A1 | 11/2007 |

(Continued)

OTHER PUBLICATIONS

Documents relating to International App. No. PCT/IB2015/001416 (CIPO Examination Notes for PCT/IB2015/001416 conducted on Nov. 3, 2015).
(Continued)

*Primary Examiner* — James J Yang
(74) *Attorney, Agent, or Firm* — Bereskin & Parr LLP/S.E.N.C.R.L., s.r.l.

(57) ABSTRACT

A device and system for managing medication delivery devices includes a case with a housing having an opening for receiving a medication delivery device. A cover is configured and arranged to cover the opening. A medication delivery device such as: an auto injector is disposed in the housing. A sensor to detect the position of the cover may be provided. An electronic control system is operatively associated with the housing and disposed in wireless communication with a gateway device. The electronic control system is configured and arranged to provide a signal to the gateway device when the case is within, proximity of the gateway device. The electronic control system is also configured and arranged to transmit corresponding signals to the gateway (Continued)

device based on the position of the cover, the presence of the medication delivery device in the case, and/or the activation of the delivery device.

9 Claims, 6 Drawing Sheets

Related U.S. Application Data

(60) Provisional application No. 62/012,147, filed on Jun. 13, 2014.

(51) Int. Cl.
  *G08B 21/24* (2006.01)
  *A61J 1/03* (2006.01)
  *A61J 7/04* (2006.01)
  *H04W 4/02* (2018.01)
  *H04W 68/02* (2009.01)
  *H04B 5/00* (2006.01)
  *H04W 88/16* (2009.01)

(52) U.S. Cl.
  CPC ............. *H04W 4/023* (2013.01); *H04W 4/90* (2018.02); *H04W 68/02* (2013.01); *H04B 5/0025* (2013.01); *H04B 5/0062* (2013.01); *H04W 88/16* (2013.01)

(56) References Cited

U.S. PATENT DOCUMENTS

| | | | |
|---|---|---|---|
| 7,713,229 B2 | 5/2010 | Veit et al. |
| 7,731,686 B2 | 6/2010 | Edwards et al. |
| 7,749,194 B2 | 7/2010 | Edwards et al. |
| 7,752,085 B2 | 7/2010 | Monroe |
| 7,782,192 B2 | 8/2010 | Jeckelmann et al. |
| 7,871,393 B2 | 1/2011 | Monroe |
| 7,901,383 B2 | 3/2011 | Follman et al. |
| 8,044,778 B2 | 10/2011 | Monroe |
| 8,149,111 B2 | 4/2012 | Monroe |
| 8,172,082 B2 | 5/2012 | Edwards et al. |
| 8,206,340 B2 | 6/2012 | Arefieg |
| 8,212,658 B2 | 7/2012 | Monroe |
| 8,361,026 B2 | 1/2013 | Edwards et al. |
| 8,544,645 B2 | 10/2013 | Edwards et al. |
| 8,551,039 B2 | 10/2013 | Veit et al. |
| 8,562,558 B2 | 10/2013 | Kamath et al. |
| 8,639,288 B1 | 1/2014 | Friedman |
| 8,672,899 B2 | 3/2014 | Diller et al. |
| 8,690,827 B2 | 4/2014 | Edwards et al. |
| 8,808,228 B2 | 8/2014 | Brister et al. |
| 8,817,258 B2 | 8/2014 | Whalley et al. |
| 8,882,704 B2 | 11/2014 | Fago et al. |
| 8,899,987 B2 | 12/2014 | Edwards et al. |
| 8,920,374 B2 | 12/2014 | Bokelman et al. |
| 8,922,367 B2 | 12/2014 | Denny et al. |
| 8,926,594 B2 | 1/2015 | Edwards et al. |
| 8,932,252 B2 | 1/2015 | Edwards et al. |
| 8,979,799 B1 | 3/2015 | Askarinya et al. |
| 9,022,980 B2 | 5/2015 | Edwards et al. |
| 9,069,333 B1* | 6/2015 | Romans ................. G04G 13/02 |
| 9,125,991 B2 | 9/2015 | Schabbach et al. |
| 9,138,539 B1 | 9/2015 | Friedman |
| 9,250,111 B2 | 2/2016 | Whalley et al. |
| 9,255,830 B2 | 2/2016 | Whalley et al. |
| 9,295,784 B2 | 3/2016 | Eggert et al. |
| 9,327,077 B2 | 5/2016 | Edwards et al. |
| 9,358,334 B2 | 6/2016 | Arefieg |
| 9,381,294 B2 | 7/2016 | Ziegner |
| 9,457,147 B2 | 10/2016 | Green |
| 9,474,869 B2 | 10/2016 | Edwards et al. |
| 9,492,618 B2 | 11/2016 | Day |
| 9,517,307 B2 | 12/2016 | Blondino et al. |
| 9,539,386 B2 | 1/2017 | Askarinya et al. |
| 9,539,392 B2 | 1/2017 | Jennings et al. |
| 9,542,826 B2 | 1/2017 | Edwards et al. |
| 9,555,191 B2 | 1/2017 | Edwards et al. |
| 9,566,395 B2 | 2/2017 | Denny et al. |
| 9,579,459 B2 | 2/2017 | Jennings et al. |
| 9,597,452 B2 | 3/2017 | Henderson et al. |
| 9,623,188 B2 | 4/2017 | Nielsen et al. |
| 9,638,564 B2 | 5/2017 | Whalley et al. |
| 9,642,968 B2 | 5/2017 | Whalley et al. |
| 9,651,482 B2 | 5/2017 | Blei et al. |
| 9,656,024 B2 | 5/2017 | Eggert et al. |
| 9,669,158 B2 | 6/2017 | McLoughlin et al. |
| 9,672,328 B2 | 6/2017 | Saint et al. |
| 9,682,200 B2 | 6/2017 | Denny et al. |
| 9,724,471 B2 | 8/2017 | Edwards et al. |
| 9,737,663 B2 | 8/2017 | Jennings et al. |
| 9,741,139 B2 | 8/2017 | Kamath et al. |
| 9,750,899 B2 | 9/2017 | Ostrander et al. |
| 9,764,084 B2 | 9/2017 | McLoughlin et al. |
| 9,764,101 B2 | 9/2017 | McLoughlin et al. |
| 9,775,957 B2 | 10/2017 | Despa et al. |
| 9,805,620 B2 | 10/2017 | Edwards et al. |
| 9,814,651 B2 | 11/2017 | Wengreen et al. |
| 9,836,948 B2 | 12/2017 | Edwards et al. |
| 9,886,556 B2 | 2/2018 | Booth et al. |
| 9,911,308 B2 | 3/2018 | Edwards et al. |
| 9,919,106 B2 | 3/2018 | Friedman |
| 9,949,894 B2 | 4/2018 | Puglisi |
| 9,959,391 B2 | 5/2018 | Saint et al. |
| 10,022,506 B2 | 7/2018 | Pribitkin |
| 10,046,115 B2 | 8/2018 | Bokelman et al. |
| 10,076,611 B2 | 9/2018 | Edwards et al. |
| 10,092,688 B2 | 10/2018 | Robinson et al. |
| 10,092,706 B2 | 10/2018 | Denzer et al. |
| 10,105,489 B2 | 10/2018 | Edwards et al. |
| 10,143,792 B2 | 12/2018 | Edwards et al. |
| 10,163,311 B2 | 12/2018 | Herschkowitz et al. |
| 10,183,120 B2 | 1/2019 | Sihlanick et al. |
| 10,192,464 B2 | 1/2019 | Edwards et al. |
| 10,220,158 B2 | 3/2019 | Blondino et al. |
| 10,229,578 B2 | 3/2019 | Edwards et al. |
| 10,238,806 B2 | 3/2019 | Edwards et al. |
| 10,258,735 B2 | 4/2019 | Edwards et al. |
| 10,258,743 B2 | 4/2019 | Whalley et al. |
| 10,322,239 B2 | 6/2019 | Edwards et al. |
| 10,331,996 B2 | 6/2019 | Schneider et al. |
| 10,332,623 B2 | 6/2019 | Edwards et al. |
| 10,342,924 B2 | 7/2019 | Edwards et al. |
| 10,391,244 B2 | 8/2019 | Schweikert et al. |
| 10,391,246 B2 | 8/2019 | Henderson et al. |
| 10,398,524 B2 | 9/2019 | Denny et al. |
| 10,398,852 B2 | 9/2019 | Taylor et al. |
| 10,413,667 B2 | 9/2019 | Henderson et al. |
| 10,420,623 B2 | 9/2019 | Ostrander et al. |
| 10,420,895 B2 | 9/2019 | Erbstein et al. |
| 10,441,714 B2 | 10/2019 | Kapas et al. |
| 2010/0169111 A1* | 7/2010 | Brue ...................... G16H 40/67 340/541 |
| 2011/0279271 A1 | 11/2011 | Monroe |
| 2012/0001750 A1 | 1/2012 | Monroe |
| 2013/0023822 A1 | 1/2013 | Edwards et al. |
| 2014/0155827 A1* | 6/2014 | Ostrander .......... A61B 50/3001 604/93.01 |
| 2014/0221925 A1* | 8/2014 | Kondoh ............ A61M 5/31568 604/111 |

FOREIGN PATENT DOCUMENTS

| | | | |
|---|---|---|---|
| CA | 2825637 A1 | 8/2012 |
| CA | 2893413 A1 | 6/2014 |
| CA | 2893420 A1 | 6/2014 |
| CA | 2896708 A1 | 7/2014 |
| CA | 2896746 A1 | 7/2014 |
| WO | 2008079340 A2 | 7/2008 |
| WO | 2008079340 A3 | 7/2008 |
| WO | 2014089083 A1 | 6/2014 |
| WO | 2014089086 A1 | 6/2014 |

(56) References Cited

FOREIGN PATENT DOCUMENTS

WO      2014106056 A2    7/2014
WO      2015189700 A1    12/2015

OTHER PUBLICATIONS

Documents relating to International App. No. PCT/IB2015/001416 mailed on Nov. 16, 2015 (Search Report).
Documents relating to International App. No. PCT/IB2015/001416 mailed Dec. 22, 2016 (International Preliminary Report on Patentability).

* cited by examiner

US 11,386,771 B2

SYSTEM AND DEVICE FOR MANAGEMENT OF MEDICATION DELIVERY DEVICES

CROSS-REFERENCE TO RELATED APPLICATIONS

This application is a continuation of PCT International Application PCT/IB2015/001416, filed Jun. 15, 2015, which claims the benefit of U.S. Provisional Application No. 62/012,147, filed Jun. 13, 2014. The entire content of PCT Application No. PCT/IB2015/001416 and U.S. Provisional Application No. 62/012,147 are incorporated herein by reference.

TECHNICAL FIELD

The present invention relates generally to the field of devices for the delivery of medications, and more particularly to a system and device for managing and monitoring the use of a medication delivery device.

BACKGROUND ART

There is a growing need for medication delivery devices, such as but not limited to auto injectors, jet injectors, syringes, oral inhalers, transdermal and other topical absorption mechanisms, oral, topical, or other spray, or the like, for use by persons with medical conditions that may require real-time management and monitoring. Rescue medication is one category of medications that are provided by a medication delivery device. The need for rescue medication and the use of medication delivery devices such as auto-injectors for rescue medication is also increasing. For people with those needs, carrying a medication delivery device represents a daily routine that impacts their normal life. Specifically, in the case of teens that require rescue medication it is challenging for parents to be sure their child is safe while helping to build their children's independence.

In general there are several issues that need to be addressed for people who carry medication delivery devices with rescue medication: lost or forgotten medication delivery device; expired medication; rescue medication that has been exposed to temperatures and other environmental factors outside predetermined ranges; reliable integration with the technology of new and existing support groups; bystander notifications in case of medical emergency; user's and user's support groups (such as family) assurance and peace of mind; and supporting and building vigilance behaviors and attitudes. What is needed is a comprehensive system for managing and monitoring the use of medication delivery devices.

BRIEF SUMMARY OF THE INVENTION

With parenthetical reference to the corresponding parts, portions or surfaces of the disclosed embodiment, merely for the purposes of illustration and not by way of limitation, the present invention meets the above described need by providing a case (8) for use with a medication delivery device (13), a medication delivery device (13) with an integrated electronic control system, and a medication delivery device management system. The case (8) for use with a medication delivery device (13) includes a housing (10) having an opening (16) bordering a cavity (58) defined therein. The cavity (58) is sized to receive the medication delivery device (13). A cover (22) is disposed adjacent to the opening (16) in the housing (10) and is capable of moving between an open position and a closed position where it covers the opening (16) in the housing (10), A sensor (80) for detecting the presence of the medication delivery device (13) is disposed in the housing (10).

An electronic control system (43) is disposed in wireless communication with a gateway device (82) for connecting to a communications network (100). The electronic control system is configured and arranged to provide a signal indicating that the case (8) is in proximity to the gateway device (82).

The case (8) may further comprise an environmental sensor (44) selected from the group consisting of temperature, light, vibration, pressure, motion, pollution and humidity.

The case (8) may further comprise an emergency standby button (46) configured and arranged such that a user holds the button (46) while assessing an emergency situation and in the event that the user releases the button (46) without following a predetermined routine, an alarm signal will automatically be sent to the gateway device (82) to trigger an auditory alarm perceptible to bystanders and to send an alert to one or more support groups. The case (8) may also directly trigger a local visual or audible alarm or the like.

In another aspect, the gateway device (82) is configured and arranged to send a wireless signal to the housing (10) to provide a paging feature. The signal may cause the housing (10) to emit sound or light to provide for locating the case (8).

In another aspect of the invention, the gateway device (82) automatically receives a signal from the electronic control system (43) when the medication delivery device (13) is removed from the case (8) and the gateway device (82) automatically sends a corresponding alert via a communication network (100) to one or more support groups (49).

In another aspect, the corresponding alert includes information regarding the location of the user of the case (8).

In another aspect of the invention, the gateway device (82) automatically receives a communication from the electronic control system (43) when the case (8) is opened and the gateway device (82) automatically sends a corresponding alert via a communication network (100) to one or more support groups (49).

In another aspect of the invention, upon receipt of a signal indicating that the medication delivery device (13) is not present in the case (8), the gateway device (82) sends a polling signal to the user which requires an active response from the user within a predetermined time.

The case (8) may further comprise the gateway device (82) triggering an audible alarm when the user does not respond to the polling signal.

In another aspect of the invention the gateway device (82) sends a signal that triggers an audible alarm on the housing (10) to provide an alert to persons in the vicinity of the case (8).

In another aspect, the medication delivery device (13) further comprises an electronic tag (62) identifying the medication delivery device (13) contained in the case (8).

In another aspect, the cover (22) is sealingly attached to the housing (10) to protect the medication delivery device (13).

In another aspect, the case further comprises means for providing power (70) to the electronic control system (43).

In another aspect, the corresponding alert includes information regarding the location of the user of the case (8).

In another aspect of the invention a medication delivery device (13) includes an electronic control system (43) operatively associated with the medication delivery device (13) and disposed in wireless communication with a gateway device (82) for connecting to a communications network (100). The electronic control system (43) is configured and arranged to provide signal indicating that the medication delivery device (13) is in proximity to the gateway device (82). When the medication delivery device (13) is activated, the electronic control system (43) automatically transmits a signal to the gateway device (82).

The medication delivery device (13) may further comprise an environmental sensor (44) selected from the group consisting of temperature, light, vibration, pressure, motion, pollution and humidity.

The medication delivery device (13) may further comprise an emergency standby button (46) configured and arranged such that a user holds the button (46) while assessing an emergency situation and in the event that the user releases the button (46) without following a predetermined routine, an alarm signal will automatically be sent to the gateway device (82) to trigger an auditory alarm perceptible to bystanders and to send an alert to one or more support groups. The medication delivery device (13) may also directly trigger a local visual or audible alarm or the like on the device (13).

In another aspect, the gateway device (82) is configured and arranged to send a wireless signal to the medication delivery device (13) to provide a paging feature. The signal may include an auditory or visual signal emitted from the medication delivery device (13).

In another aspect, the medication delivery device further comprises means for providing power (70) to the electronic control system (43).

In another aspect of the invention, a medication delivery device management system includes a medication delivery device (13) and an electronic control system (43) operatively associated with the medication delivery device (13). The electronic control system (43) is disposed in wireless communication with a gateway device (82) for connecting with a communications network (100). The electronic control system (43) is configured and arranged to provide a signal to the gateway device (82) indicating that the medication delivery device (13) is in proximity to the gateway device (82). Also, the electronic control system (43) automatically sends a signal to the gateway device (82) when the medication delivery device (13) is activated.

The medication delivery management system may further comprise an environmental sensor (44) selected from the group consisting of temperature, light, vibration, pressure, motion, pollution and humidity.

In another aspect upon receipt of an alert from the electronic control system (43), the gateway device (82) automatically transmits a corresponding alert to one or more support groups (49).

In another aspect, the gateway device (82) is configured and arranged to send a wireless signal to the medication delivery device (13) to provide a paging feature.

In another aspect, wherein upon receipt of a signal indicating that the medication delivery device (13) has been removed from a case (8), the gateway device (82) sends a polling signal to the user which requires an active response from the user within a predetermined time.

In another aspect, the gateway device (82) triggers an audible alarm on one of the case (8) and the medication delivery device (13) when the user does not respond to the polling signal.

In another aspect, the gateway device (82) sends a signal that triggers an audible alarm on the medication delivery device (13) to provide an alert to persons in the vicinity of the medication delivery device (13).

In another aspect, the medication delivery device (13) further comprises an electronic tag (62) identifying the medication delivery device (13).

In another aspect, the system provides a notification when the medication has expired.

In another aspect, the system provides a notification when the environmental sensor (44) registers a reading that is outside a predetermined range.

DESCRIPTION OF THE PREFERRED EMBODIMENTS

Figure 1:
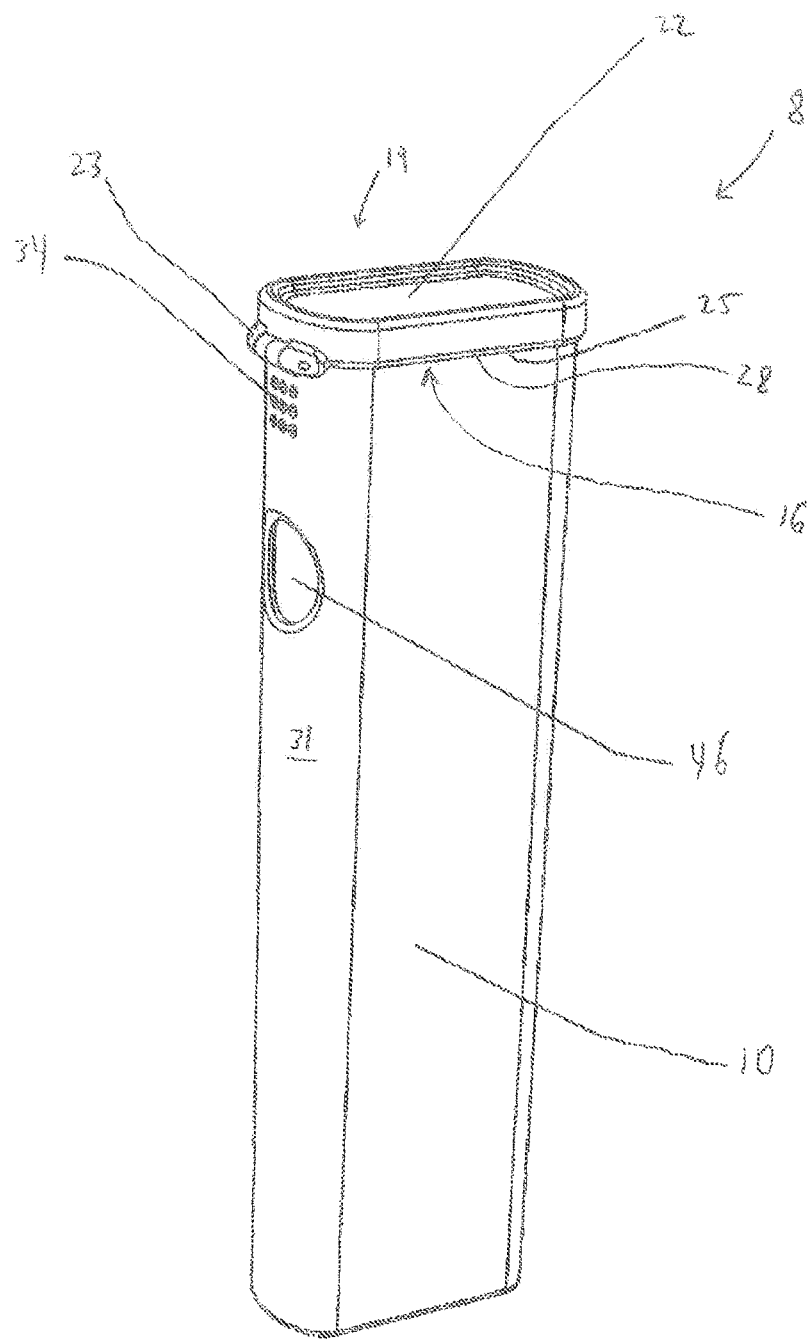
FIG. 1 is a perspective view of the case.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, debris, etc.) together with the specification, and are to be considered a portion of the entire written description of this invention. As used in the following description, the terms "horizontal", "vertical", 'left", "right", "up" and "down", as well as adjectival and adverbial derivatives thereof, (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or of rotation, as appropriate.

Figure 2:
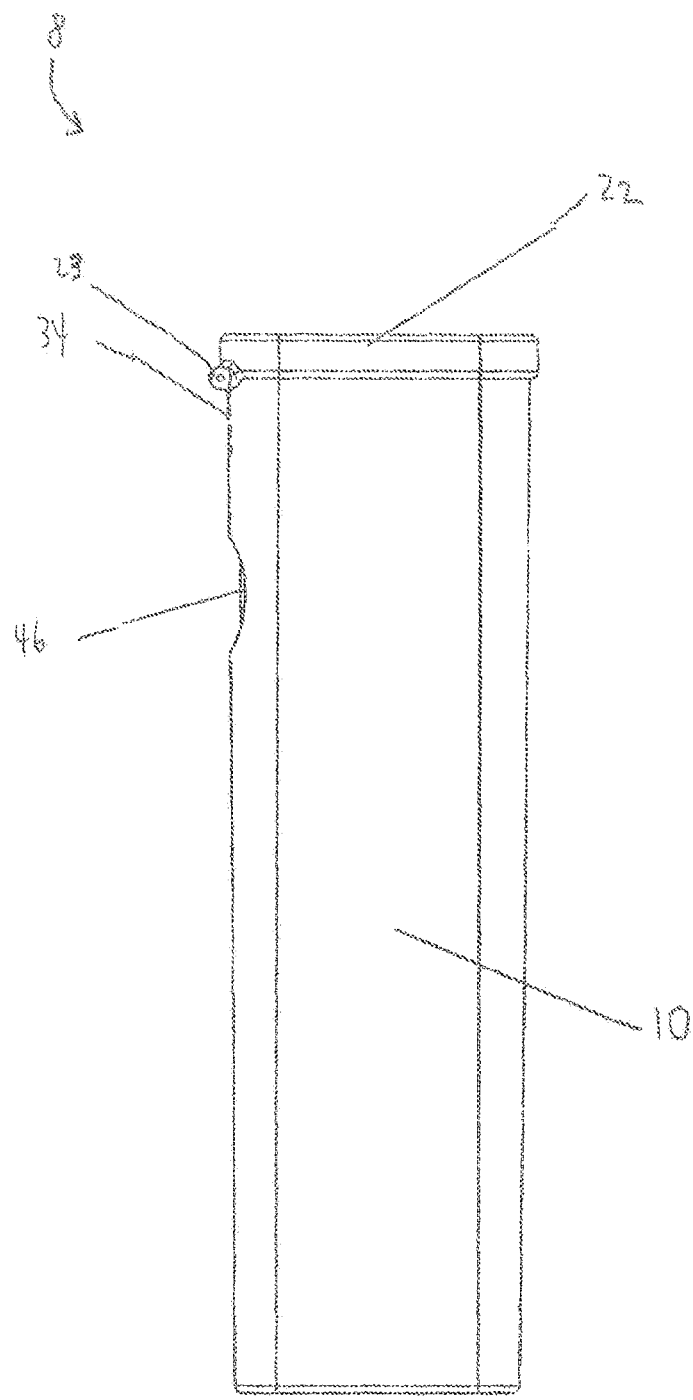
FIG. 2 is a right side elevational view of the case.
Figure 3:
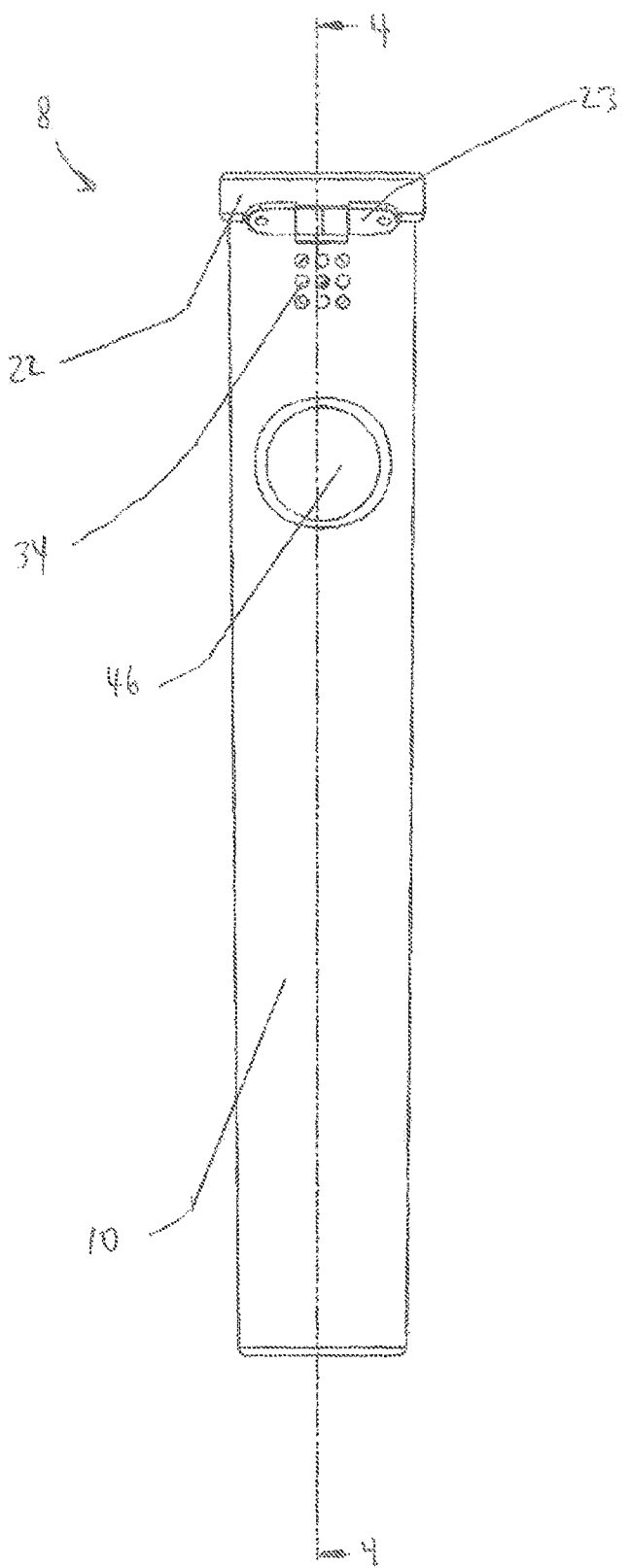
FIG. 3 is a front elevational view of the case.
Figure 4:
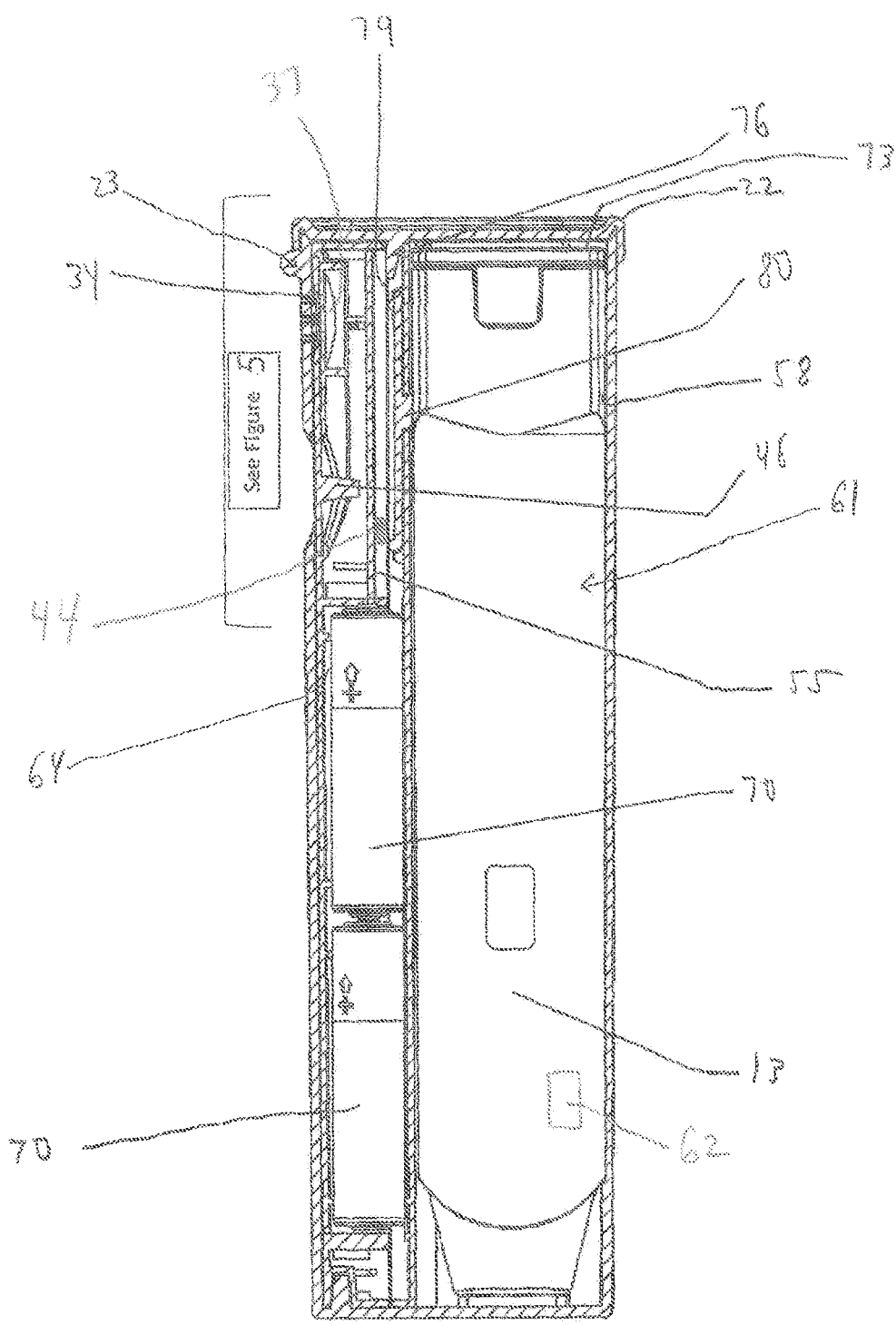
FIG. 4 is a cross-sectional view taken along lines 4-4 of FIG. 3.
Figure 5:
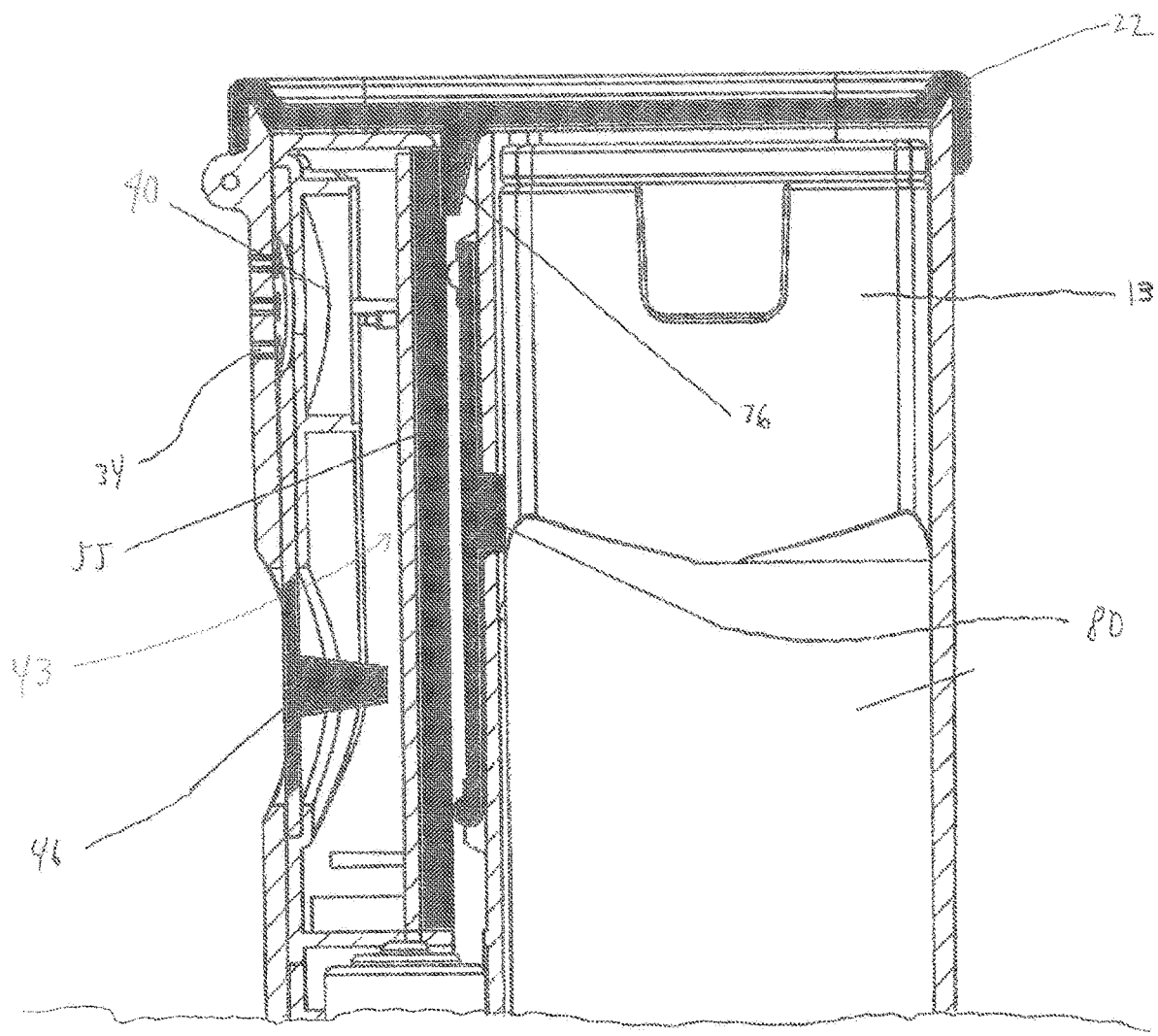
FIG. 5 is an enlarged view of a portion of FIG. 4.
Figure 6:
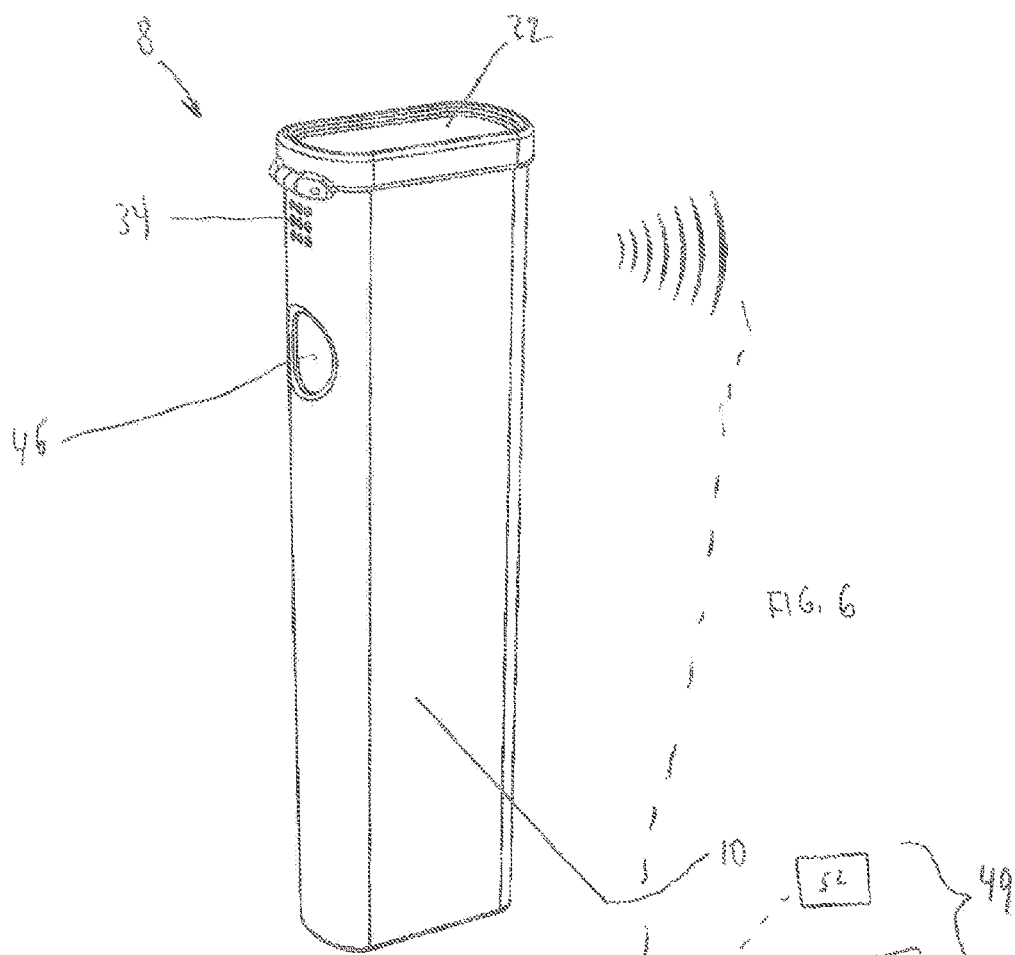
FIG. 6 is a perspective view of the case.

Referring now to the drawings, and initially to FIGS. 1-3 thereof, a first embodiment of the invention provides a case 8 having a housing 10 with an onboard electronic control system 43 (FIGS. 4-5) disposed therein. The housing 10 may be constructed of suitable materials such as plastic or the like. The housing 10 may be constructed of a transparent or translucent material. If the housing 10 is constructed of a thermoplastic it may be molded into shape as will be evident to those of ordinary skill in the art based on this disclosure. The primary purpose of the housing 10 is to store a medication delivery device such as an auto-injector 13 (FIGS. 4-5). The system may also be used with other medication delivery devices, such as but not limited to jet injectors, syringes, oral inhalers, transdermal and other topical absorption mechanisms, oral topical, or other spray, or the like. The medications used with other delivery devices may require real-time or occasional management and monitoring. Rescue medication is only one category of medications that are provided by a medication delivery device. As an alternative, the onboard electronics described herein may be incorporated directly into a medication delivery device 13 without the use of a case 8.

The housing 10 provides protection for the auto-injector 13 against physical damage due to dropping and provides protection against environmental damage due to ultraviolet radiation or the like. The housing 10 may have an opening 16 at one end 19. The end 19 may be provided with a cover 22 that has a surface 25 that provides a seal against the edges 28 of the housing 10 surrounding the opening 16. The sealed cover 22 offers protection against the entry of moisture and/or dirt into the housing 10. The cover 22 may be attached to the housing by a hinge 23 or may be movable between an open position and a closed position by other means known to those of ordinary skill in the art based on this disclosure.

The outside surface 31 of the housing 10 may be provided with a plurality of openings that provide a path for light emanating from a light source 37 disposed in the housing 10. Also, the openings 34 may provide a path for sound from a sound emitting device 40 disposed in the housing 10. The light and sound emanating from the housing 10 may be controlled by an electronic control system 43 described in greater detail herein. The lights and sounds provide several functions including paging to assist a user in locating a misplaced housing 10. Also, the user may be provided with automatic audible instructions during an emergency situation. And in an emergency situation where the user is incapacitated, the lights and sounds may provide an alert to third party bystanders to provide or summon aid for the user.

Figure 7:
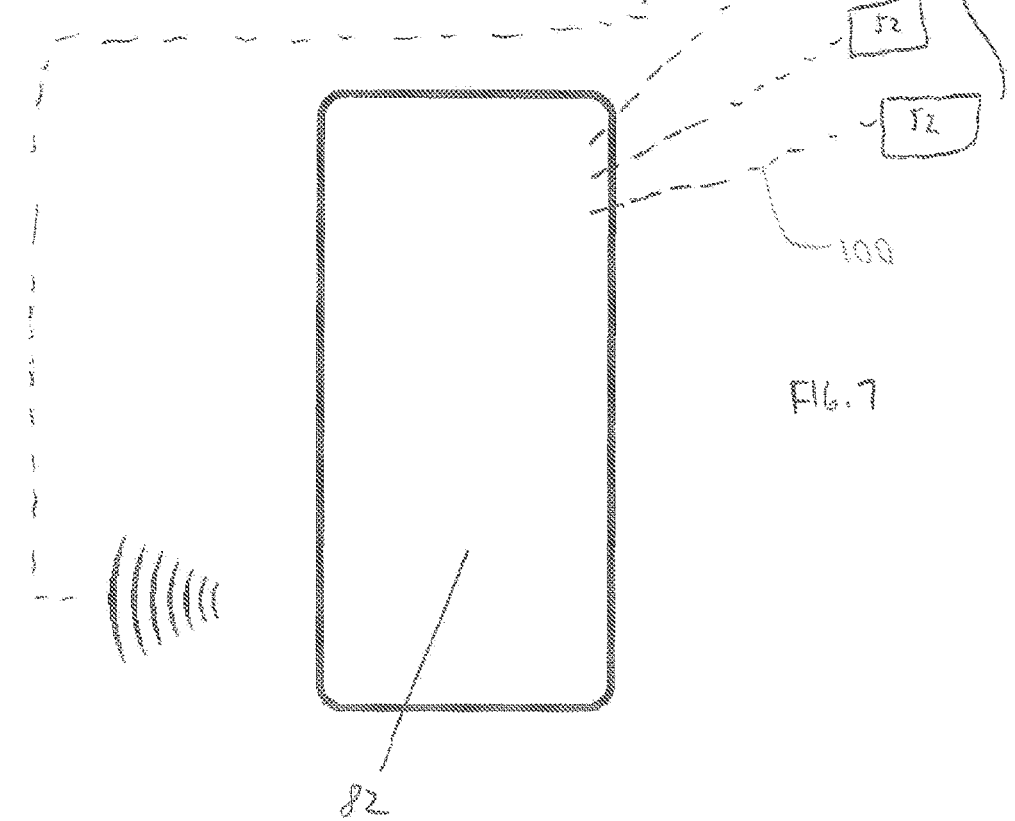
FIG. 7 is a top plan view of a mobile device.

The housing 10 may also be provided with an emergency/standby button 46. The user can press and hold the emergency standby button 46 while assessing the situation during a potential emergency event. If the user decides that they are safe they can deactivate the alert and verbal notification by pressing the button 46 a predetermined number of times after releasing it. Or, in the event that they are no longer able to hold the button 46, the electronic control system 43 triggers an alert to one or more support groups 49 of persons having connected devices 52 (FIG. 7) and activates a local audible alert via the sound emitting device 40 in the housing 10.

Turning to FIG. 4, the electronic control system 43 disposed in the housing 10 includes a board 55 that communicates with all of the switches, sensors, wireless communication components and supporting circuits as described herein. The interior of housing 10 may be divided into cavities. The first cavity 58 provides an elongate space 61 for receiving a medication delivery device such as the auto injector 13. The auto injector 13 may be provided with an electronic tag 62 such as an RFID tag including identifying information regarding the auto injector 13 such as brand, serial number, date of manufacture, date of expiration, or the like. A second cavity 64 provides a space for the electronic control system 43, sensors, and a power source 70. The power source 70 may comprise batteries. Other power sources such as wired, rechargeable batteries, non-rechargeable batteries or parasitic power sources may also be suitable as will be evident to those of ordinary skill in the art based on this disclosure.

When the cover 22 is in the closed position shown in FIG. 4, the cover 22 extends across the opening 73 of the first cavity 58 and is sealingly engaged with the ends of the housing 10. In one example of a sensor for detecting whether the case 8 has been opened, the cover 22 may include a projection for mechanically throwing a switch 79 disposed on the board 55. The cover 22 may have a projecting portion 76 that may alter the state of a switch 79 to indicate the position of the cap 22. The switch 79 may change state depending on whether the cover 22 is in the open or closed position and is operatively associated with the electronic control system 43.

The case 8 may also be provided with a sensor for detecting the presence of a medication delivery device within the housing 10. For example, switch 80 may be connected to the electronic control system 43 to detect the presence of the rescue medication delivery device. The switch 80 changes state depending on whether the auto-injector 13 is present in the housing 10. Other sensors such as capacitative, optical, or the like may also be used to detect the presence of the medication delivery device 13 within the case 8.

The electronic control system 43 in the housing 10 is configured to wirelessly communicate with a user's device 82 (FIG. 7) via a wireless short range communication, standard such as the BLUETOOTH brand Smart standard. The device 82 is a gateway device for connecting to a communications network. The device 82 may include, but is not limited to, a mobile device such as a cell phone, tablet, phablet, wearable device such as a smartwatch or the like. The device 82 may also include a wired device such as a computer located in a building or facility where users carry medication deliver devices.

The communications network 100 connected to by the gateway device 82 may comprise a large communications network for connecting the gateway device 82 to one or more support groups 49 of connected devices 52. Accordingly, a condition at the housing 10 may be communicated to the local device 82 via short range communications and then a broadcast communication (i.e. group e-mail or group text) may be automatically sent via the communication network 100 to the group 49 that may comprise a private support group of the user. The communication may also be sent to a larger public, network such as first responders.

The electronic control system 43 may also be provided with environmental sensors 44 such as a temperature sensor that may be disposed on the main circuit board 55. The temperature of the environment may adversely affect the medication, and therefore may need to be monitored. Other environmental sensors 44 such as humidity, light (visible, UV, and infrared and other forms of electromagnetic radiation), atmospheric and local pressure, moisture, vibration and other forms of mechanical impact, motion, pollution and other forms of atmospheric contaminants, or the like may also be applicable for certain situations.

Inserting or charging the batteries 70 or providing power from the power source will activate the system electronics, and the user can establish the wireless connection (e.g. BLUETOOTH brand Smart standard) between the case 8 and the gateway device 82. The gateway device 82 may be provided with a software application that controls the communication between the electronic control system 43 and the gateway device 82 and provides a dashboard or other user interface for managing the system. Once the system is up and running, the user may insert a medication delivery device such as an auto-injector 13 into the housing 10. With the auto-injector 13 inserted in the housing 10, the auto-injector engages the sensor causing the state of the switch 80 to change. The electronic control system 43 may provide Information to the user's gateway device (via the wireless connection) confirming that the auto-injector 13 is properly installed in the housing 10. Moving the cover 22 from the open to the closed position engages the cover sensing switch 79 which will generate a signal to the user's device 82 via the wireless connection that the housing 10 is properly sealed. At this point, the system will start monitoring and managing the following features: proximity of the case 8 relative to the device 82; temperature and other environmental sensors 44; expiration date of the rescue medication; emergency use of the rescue medication; access to the support network; and bystander notifications in case of medical emergency.

With regard to proximity monitoring, this function is performed through constant wireless communication (e.g. using the BLUETOOTH brand Smart standard) between the system and the application on the device 82. If the communication is interrupted (due to attenuation of received wireless power signal due to distance), the application on the device 82 will automatically notify the user that the system is out of proximity. The system automatically triggers a notification on the user's mobile device 82 and optionally, to its private support group 49, To provide additional flexibility when the use is in locations considered low-risk, such as home, the user can configure "safety zones" with larger proximity areas based on geolocation or other wireless facilities. The user can then take the necessary action (e.g., return to the location of the case 8) to bring the case 8 back into the communication range. This scenario applies if, for example, the user leaves the case 8 at home or somewhere else.

Proximity monitoring may also be used to find the auto-injector 13 if the user forgets the location of the case 8 (assuming the auto-injector is inside the case 8). On the application on the device 82 the user can access the "find me" or paging feature. Once this feature is enabled, the application on the device 82 will communicate wirelessly with the electronic control system 43 and cause the case 8 to emit an audio tone and visual indicators for the user to easily locate the misplaced auto-injector 13. The application on the mobile device 82 remembers the last known location of the user's device so it can find the monitored enclosure in the house or even across the city. As an alternative, the device 82 may send a signal to an electronic control system 43 that is integrated into the medication delivery device such as the body of the auto-injector 13 itself.

The environmental sensor 44 on the electronic board 55 inside the case 8 monitors the temperature inside the housing 10. If the measured temperature goes outside of the operating range set by the user, the application on the device 82 will inform the user of that event. The sensor will monitor the temperature range (and other environmental data) even if there is no wireless communication between the mobile application and the system. Once connected, the temperature monitoring activity is uploaded to the application on the device 82 and if the data points outside the operating range the user will be notified.

In case of an emergency where the user needs to use the rescue medication, once the cover 22 is open and the auto injector 13 is removed, the system will automatically send an alert in real-time to everyone in the user's private support group 49. Based on the user's preferences, this alert may also be sent to people in the extended and public community support groups that are close to the user. Information about the user's location may be shared with the user's support group so that they can come to the user's aid directly and/or contact emergency services on behalf of the user.

The present invention contemplates that many changes and modifications may be made. Therefore, while the presently-preferred form of the system and device for management of medication delivery devices has been shown and described, and several modifications and alternatives discussed, persons skilled in this art will readily appreciate that various additional changes and modifications may be made without departing from the spirit of the invention, as defined and differentiated by the following claims.

We claim:

1. A case for use with a medication delivery device, the case comprising:
    a housing having an opening bordering a cavity defined therein, the cavity sized to receive the medication delivery device;
    a cover disposed adjacent to the opening in the housing and capable of moving between an open position and a closed position where it covers the opening in the housing;
    a sensor for detecting the presence and absence of the medication delivery device in the cavity; and,
    an electronic control system disposed in wireless communication with a gateway device for connecting to a communications network, wherein the electronic control system is configured and arranged to provide a signal indicating that the case is in proximity to the gateway device,
    wherein the electronic control system sends a notification signal to the gateway device in response to the sensor detecting that the medication delivery device has been removed from the case.

2. The case of claim 1, further comprising an environmental sensor selected from the group consisting of temperature, light, vibration, pressure, motion, pollution and humidity.

3. The case of claim 1, further comprising an emergency standby button configured and arranged such that a user holds the button while assessing an emergency situation and in the event that the user releases the button without following a predetermined routine, an alarm signal will automatically be sent to the gateway device to trigger an auditory alarm perceptible to bystanders.

4. The case of claim 1, wherein the gateway device is configured and arranged to send a wireless signal to the housing to provide a paging feature.

5. The case of claim 1, wherein the gateway device automatically sends an alert via a communication network to one or more support groups in response to receiving the notification signal.

6. The case of claim 5, wherein the corresponding alert includes information regarding the location of the user of the case.

7. The case of claim 1, wherein the gateway device, automatically receives a communication from the electronic control system when the case is opened and the gateway device automatically sends a corresponding alert via a communication network to one or more support groups.

8. The case of claim 1, wherein the medication delivery device further comprises an electronic tag identifying the medication delivery device contained in the case.

9. The case of claim 1, further comprising:
    a standby button that is user-actuatable to deactivate an alert by the electronic control system.

* * * * *